United States Patent
Jia et al.

(10) Patent No.: US 12,345,971 B1
(45) Date of Patent: Jul. 1, 2025

(54) METHOD, DEVICE, AND MEDIUM FOR CONTROLLING LIQUID CRYSTAL GLASS SUNSHADE

(71) Applicant: GUANGZHOU ISSYZONE TECHNOLOGY CO., LIMITED, Guangzhou (CN)

(72) Inventors: Zhuo Jia, Guangzhou (CN); Taiping Yang, Shenzhen (CN)

(73) Assignee: GUANGZHOU ISSYZONE TECHNOLOGY CO., LIMITED, Guangzhou (CN)

( * ) Notice: Subject to any disclaimer, the term of this patent is extended or adjusted under 35 U.S.C. 154(b) by 0 days.

(21) Appl. No.: 18/628,976

(22) Filed: Apr. 8, 2024

(30) Foreign Application Priority Data

Dec. 27, 2023 (CN) .......................... 202311816288.5

(51) Int. Cl.
*G02F 1/133* (2006.01)
*B60J 3/04* (2006.01)
*G02F 1/1333* (2006.01)

(52) U.S. Cl.
CPC ............ *G02F 1/13312* (2021.01); *B60J 3/04* (2013.01); *G02F 1/13338* (2013.01)

(58) Field of Classification Search
CPC ...... G02F 1/13312; G02F 1/13338; B60J 3/04
See application file for complete search history.

*Primary Examiner* — Donald L Raleigh
(74) *Attorney, Agent, or Firm* — Birchwood IP

(57) ABSTRACT

A method, device, and medium for controlling a liquid crystal glass sunshade are provided. The method includes the following steps: in a turn-off state, obtaining a vibration signal feedback from a vibration sensor; if the vibration signal exceeds a preset vibration threshold and simultaneously detects a presence of light intensity signal input from a photosensitive sensor and voltage input from a solar panel, the liquid crystal glass conducts with a power module and enters a turn-on state; in the turn-on state, obtaining the vibration signal feedback from the vibration sensor; if the vibration signal does not exceed the preset vibration threshold within a first preset time, or if a battery level of the power module is lower than the a battery level threshold, the liquid crystal glass will disconnect from the power module and enter the turn-off state.

10 Claims, 3 Drawing Sheets

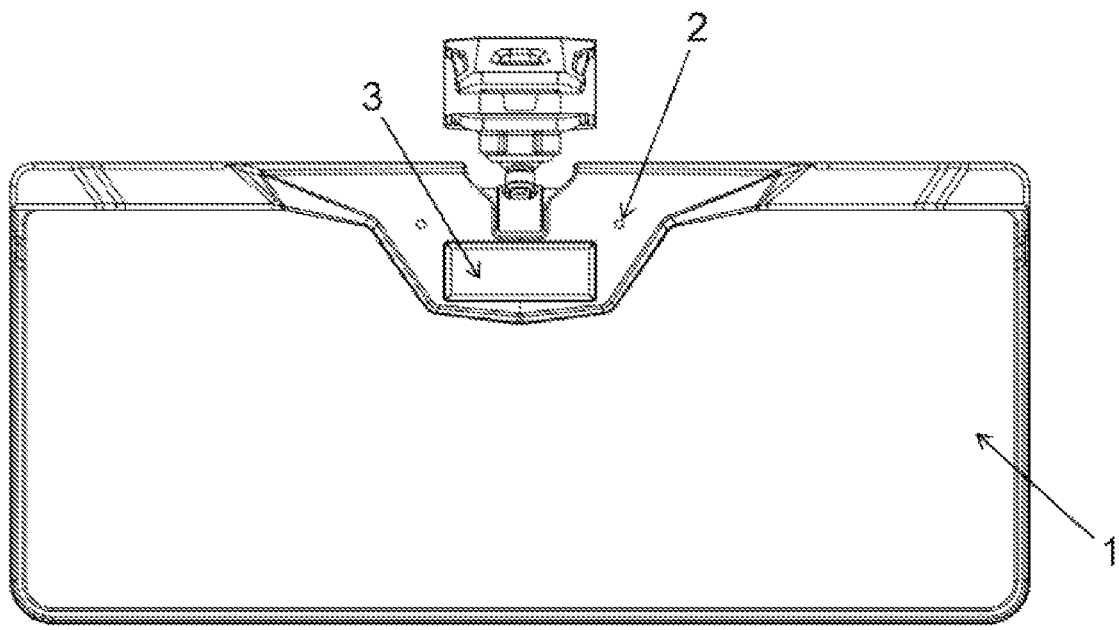

FIG. 1

| In a turn-off state, obtaining vibration signal feedback from the vibration sensor, if the vibration signal exceeds a preset vibration threshold and simultaneously detects a presence of light intensity signal input from the photosensitive sensor and voltage input from solar panel, the liquid crystal glass conducts with the power module and enters a turn-on state — S1 |

| In the turn-on state, obtaining the vibration signal feedback from the vibration sensor; if the vibration signal does not exceed the preset vibration threshold within a first preset time, or if a battery level of the power module is lower than a preset battery level threshold, the liquid crystal glass disconnects from the power module and enters the turn-off state — S2 |

FIG. 2

METHOD, DEVICE, AND MEDIUM FOR CONTROLLING LIQUID CRYSTAL GLASS SUNSHADE

CROSS-REFERENCE TO RELATED APPLICATIONS

This application claims priority to Chinese Patent Application No. 202311816288.5, filed on Dec. 27, 2023, which is hereby incorporated by reference in its entirety.

TECHNICAL FIELD

The present disclosure relates to the field of sunshade of vehicle technologies, and in particular, to a method, device, and medium for controlling a liquid crystal glass sunshade.

BACKGROUND

Traditional car sunshades are generally made of plastic and are installed above the heads of the driver and copilot to prevent glare from sunlight. Due to the fact that traditional car sunshades themselves are not transparent, in a sense, they increase the driver's visual blind spot. Therefore, various styles of filter screen sunshades have emerged on the market.

Ordinary filter screens and sunshades are made of thin film filters. Although they can block some strong sunlight, the transmittance is fixed and cannot adapt to different degrees of sunlight changes in a timely manner. For example, obstruction of buildings, the moment of entering and exiting tunnels, etc. can cause brief blind spot adaptation time visually, affecting driving safety. With the development of technology, the latest sunshades have begun to use liquid crystal glass with variable transmittance as a main material of sunshades. It controls the transmittance of the liquid crystal glass by collecting the intensity of external light through sensors, thereby achieving a goal of dynamically adjusting the transmittance. However, the battery life of the liquid crystal glass sunshades is low, due to the fact that all liquid crystal glass sunshades on the market cannot be connected to the car power supply. They use a built-in lithium battery and solar panel charging scheme. In a bright environment during the day, the control system will automatically control the transmittance of the liquid crystal glass based on the intensity of external light, However, the user often does not pay attention to the turn-on and turn-off states of the liquid crystal glass sunshade after the car is turned off, resulting in wasted energy of the lithium battery. Similarly, driver generally does not pay attention to the turn-on and turn-off states of the liquid crystal glass sunshade after entering the car. They often discover that the machine is not turned on after driving for a period of time and needs to be manually turned on temporarily, which exits significant safety hazards.

SUMMARY

In response to the above problems, the present disclosure proposes a method, device, and medium for controlling a liquid crystal glass sunshade, mainly solving at least one problem pointed out in the background technology.

To solve the above-mentioned technical problems, a first aspect of the present disclosure proposes a method for controlling a liquid crystal glass sunshade, the liquid crystal glass sunshade includes at least a liquid crystal glass, a vibration sensor, a photosensitive sensor, and a solar panel; the control method comprises the following steps:

in a turn-off state, obtaining vibration signal feedback from the vibration sensor; when the vibration signal exceeds a preset vibration threshold and simultaneously detects a presence of light intensity signal input from the photosensitive sensor and voltage input from the solar panel, the liquid crystal glass conducts with the power module and enters a turn-on state;

in the turn-on state, obtaining the vibration signal feedback from the vibration sensor; when the vibration signal does not exceed the preset vibration threshold within a first preset time, or a battery level of the power module is lower than a preset battery level threshold, the liquid crystal glass is disconnected from the power module and enters the turn-off state.

In some implementation modes, the liquid crystal glass sunshade further comprises a sliding touch panel and a feedback display screen, the liquid crystal glass sunshade has a preset lower limit value and upper limit value of transmittance; in the turn-on state, sliding signal feedback by the sliding touch panel is detected, the upper limit value of transmittance is adjusted based on the sliding signal, and the upper limit value of transmittance is displayed on the feedback display screen within a second preset time range; after the second preset time range, real-time transmittance is displayed on the feedback display screen.

In some implementation modes, the photosensitive sensor feed backs the light intensity signal at a preset time interval, dynamically adjusts the real-time transmittance of the liquid crystal glass based on the light intensity signal; when a difference between two adjacent light intensity signals exceeds the preset light intensity threshold, the lower limit value and upper limit value of transmittance are adjusted according to a preset mode.

In some implementation modes, the lower limit value and upper limit value of transmittance are adjusted according to the preset mode, including:

when the light intensity signal at a previous moment is less than the light intensity signal at a next moment, and the difference between the two light intensity signals exceeds the preset light intensity threshold, the real-time transmittance of the liquid crystal glass raises from the lower limit value of transmittance to the upper limit value of transmittance within a third preset time, or when the light intensity signal at the previous moment is greater than the light intensity signal at the next moment, and the difference between the two light intensity signals exceeds the preset light intensity threshold, the real-time transmittance of the liquid crystal glass uniformly decreases from the upper limit value of transmittance to the lower limit value of transmittance within a fourth preset time; wherein the fourth preset time is set to at least four times the third preset time.

In some implementation modes, the third preset time does not exceed 0.5 seconds, the fourth preset time is 2-3 seconds.

In some implementation modes, the liquid crystal glass sunshade further includes an on/off key, which is configured to directly conduct or disconnect the power module with the liquid crystal glass; in the turn-off state, a duration of the on/off key that is pressed is continuously detected, when the duration exceeds a fifth preset time, a preset mode selection program is entered, the preset mode selection program comprises adjusting the third preset time and the fourth preset time.

In some implementation modes, after entering the preset mode selection program, the duration of the on/off key that is pressed is continuously detected, when the duration is less than a sixth preset time, the preset mode is switched, preset mode is displayed on the feedback display screen; when the duration is greater than a seventh preset time, a selected preset mode is saved, the preset mode selection program is exited and the turn-on state is immediately entered.

In some implementation modes, the preset mode includes:
in a first mode, the third preset time is set to 0.2 seconds, the fourth preset time is set to 2 seconds;
in a second mode, the third preset time is set to 0.2 seconds, the fourth preset time is set to 3 seconds;
in a third mode, the third preset time is set to 0.5 seconds, the fourth preset time is set to 2 seconds;
in a fourth mode, the third preset time is set to 0.5 seconds, the fourth preset time is set to 3 seconds.

A second aspect of the present disclosure proposes a device for controlling a liquid crystal glass sunshade, including a memory, a processor, and a communication module,
the memory is configured to store an executable program code;
the processor is coupled with the memory;
the processor calls the executable program code stored in the memory to execute the method for controlling a liquid crystal glass sunshade.

A third aspect of the present disclosure proposes a computer storable medium, which stores a computer instruction. When the computer instruction is called, the method for controlling a liquid crystal glass sunshade is executed.

The beneficial effect of the present disclosure is to enter the turn-on state based on vibration signal, light intensity signal, and voltage input as judgment conditions, achieve automatic turning on the device, reduce manual operation by a user, and improve the safety of device use; in addition, entering the turn-off state based on vibration signal or power level of the power module can achieve automatic turning off the device, reduce an ineffective working time of the device, and improve its battery life.

BRIEF DESCRIPTION OF DRAWINGS

FIG. 1 shows a rear view of a liquid crystal glass sunshade disclosed in Embodiment 1 of the present disclosure.

FIG. 2 is a flowchart of a method for controlling the liquid crystal glass sunshade disclosed in Embodiment 1 of the present disclosure.

Figure 3:
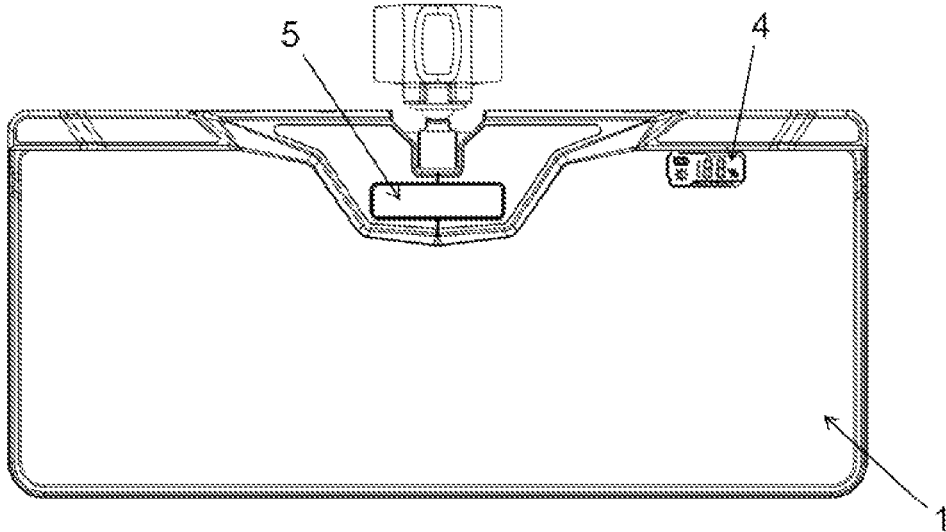
FIG. 3 is a front view of the liquid crystal glass sunshade disclosed in Embodiment 2 of the present disclosure.

Reference number: 1—Liquid crystal glass, 2—Photosensitive sensor, 3—Solar panel, 4—Sliding touch panel, 5—Feedback display screen.

DESCRIPTION OF EMBODIMENTS

In order to make the purpose, technical solution, and advantages of the present disclosure clearer and definite, the following will provide further detailed explanations of the content of the present disclosure in combination with the drawings and specific implementation modes. It can be understood that the specific embodiments described here are only intended to explain the present disclosure and not to limit it. Furthermore, it should be noted that for ease of description, only a relevant part of the present disclosure is shown in the drawings, rather than the entire content.

Embodiment 1

This embodiment proposes a method for controlling a liquid crystal glass sunshade for controlling turn-on and turn-off the liquid crystal glass sunshade. As shown in FIG. 1, the liquid crystal glass sunshade includes at least a liquid crystal glass 1, a vibration sensor (not shown), a photosensitive sensor 2, and a solar panel 3. An upper part of liquid crystal glass 1 is provided with a connection shell, the vibration sensor and control unit are provided in the connection shell. The photosensitive sensor 2 and the solar panel 3 are generally provided on a back of the connection shell to obtain suitable angle of light and solar energy.

As shown in FIG. 2, the control method includes the following steps:

S1: in a turn-off state, obtaining vibration signal feedback from the vibration sensor. If the vibration signal exceeds a preset vibration threshold and simultaneously detects a presence of light intensity signal input from the photosensitive sensor and voltage input from solar panel 3, the liquid crystal glass 1 conducts with the power module and enters a turn-on state.

In S1, vibration sensors can use three-axis sensors or micro vibration sensors to obtain a current mechanical vibration received by the device. Photosensitive sensor is any ambient light or sunlight sensor that converts light energy into electrical signal (light intensity signal). The solar panel 3 is any device that directly or indirectly converts solar radiation energy into electrical energy through photoelectric or photochemical effects by absorbing sunlight.

S2, in the turn-on state, obtaining the vibration signal feedback from the vibration sensor. If the vibration signal does not exceed the preset vibration threshold within a first preset time, or if a battery level of the power module is lower than a preset battery level threshold, the liquid crystal glass 1 will disconnect from the power module and enter the turn-off state.

In S2, the first preset time is a default value automatically recommended by the system or set by a user. For example, the first preset time can be set to 30 minutes, which means that if the vibration signal does not reach the preset vibration threshold within 30 minutes, it will be turned off directly.

In S1 and S2, the preset vibration threshold can be a value preset by the device system, the preset vibration threshold can also be set according to a user need. To reduce the false triggering of S1 process, the system (control unit) obtains vibration signals for a period of time and identifies vibration signals that have been continuously stable in a certain frequency range for a long time as interference signals. Even if the interference signal exceeds the preset vibration threshold, it will not trigger the liquid crystal glass 1 to enter the turn-on state.

There is no necessary sequential relationship between S1 and S2, which depends on a current state of the device.

In this embodiment, if the vibration signal exceeds the preset vibration threshold, it is determined that the vehicle is currently in a driving mode. At the same time, a dual light detection program is also set, which determines that the vehicle is in lighting mode when the presence of light intensity signal and voltage input is detected. If all three judgment conditions are met simultaneously, it enters the turn-on mode to achieve automatic turning on the device, reduce user manual operation, and improve the safety of device use. In addition, if the vibration signal does not exceed the preset vibration threshold within the first preset time, it is determined that the device is currently in a non-driving state, or when the power module's battery level is lower than the preset battery level threshold, it is determined that the device is currently in a low battery state. If any condition is met, it enters the turn-off state to achieve automatic turning off the device, reduce the ineffective working time of the device, and improve the device's battery life.

Embodiment 2

This embodiment proposes another method for controlling a liquid crystal glass sunshade based on Embodiment 1, providing different adjustment functions. As shown in FIG. 3, the liquid crystal glass sunshade further includes a sliding touchpad 4 and a feedback display screen 5.

Figure 4:
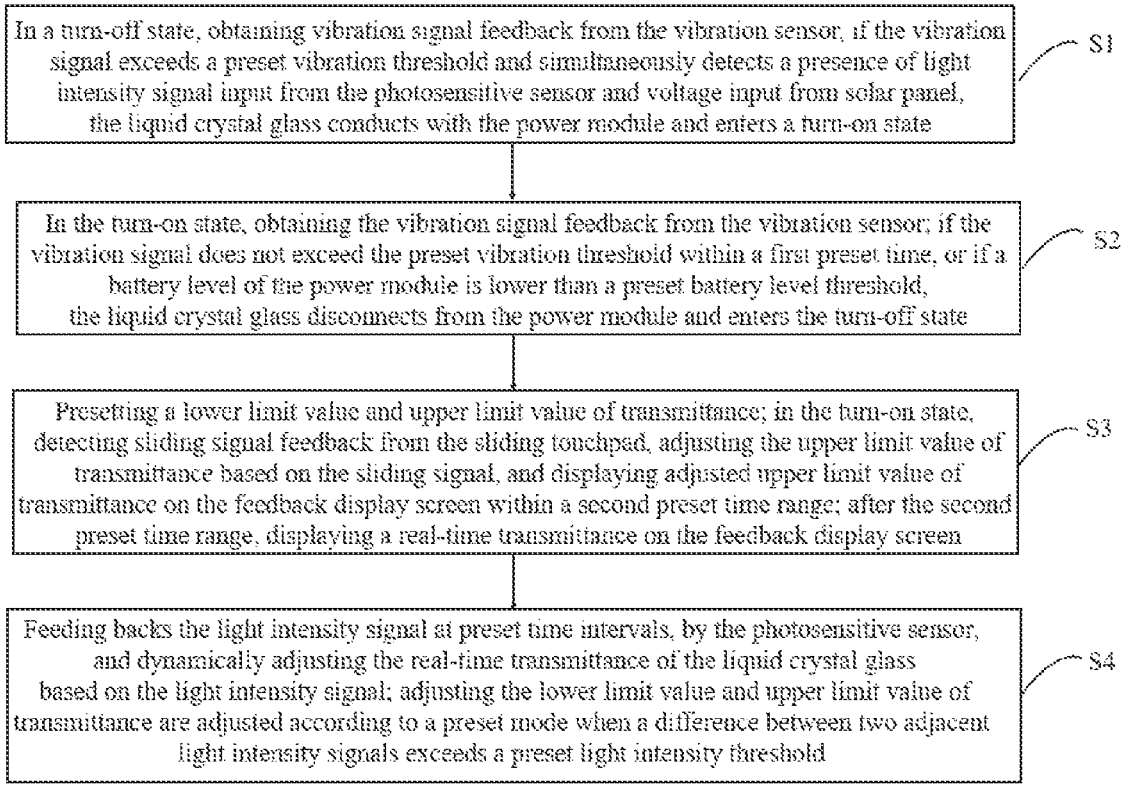
FIG. 4 is a flowchart of the method for controlling the liquid crystal glass sunshade disclosed in Embodiment 2 of the present disclosure.

As shown in FIG. 4, the control method includes the following steps:

S3, presetting a lower limit value and upper limit value of transmittance. In the turn-on state, detecting sliding signal feedback from the sliding touchpad 4, adjusting the upper limit value of transmittance based on the sliding signal, and displaying adjusted upper limit value of transmittance on the feedback display screen 5 within a second preset time range. After the second preset time range, displaying a real-time transmittance on the feedback display screen 5.

In a default state of this embodiment, the lower limit value and upper limit value of transmittance are set to 0% and 100% respectively, corresponding to a transparent and opaque states of the liquid crystal glass 1. S3 further sets the lower limit value of transmittance to be non-adjustable and the upper limit value of transmittance to be adjustable. Specifically, when the user clicks on the sliding touch panel 4 with his fingertips, the system detects the sliding signal feedback from the sliding touch panel 4 and adjusts the upper limit value of transmittance in a proportional and stepless manner. In order to ensure the safety of user driving, a minimum upper limit value of transmittance can only be adjusted to 50%. It should be noted that sliding touch panel 4 has a certain width, but the system only detects the starting and ending positions A and B of the fingertips, as well as a distance D between starting and ending points A and B. Based on parameters A, B, and D, as well as an adjusted upper limit value of transmittance calculated based on the current upper limit value of transmittance. Assuming the current upper limit value of transmittance is 100%, the maximum single adjustment is 50%, and zero reference coordinate is a leftmost end of the sliding touch panel 4. If the user's fingertip first contacts a rightmost end of the sliding touch panel 4, the system records a horizontal coordinate value of the starting point A. The user's fingertip moves (slides) to a center of the sliding touch panel 4 without leaving it, and the system records a horizontal coordinate value of the endpoint B. Based on this, the system judges a position relationship between A and B. Obviously, the value of A is larger than the value of B. Therefore, the system determines that the user's current expected operation is to lower the upper limit value of transmittance. And, according to a sliding distance of A and B, it can be inferred that a sliding distance D is 50%*50%-25%, and a final upper limit value of transmittance is adjusted to 75%.

In addition, in S3, in order to quickly prompt the user about the adjustment level of the upper limit value of transmittance, the upper limit value of transmittance during the adjustment process is displayed on the feedback display screen 5 within a specified time (second preset time range). After this time, the real-time transmittance is re-displayed on the feedback display screen 5. For example, the second preset time is generally set to 3 seconds by default, afterwards, the real-time transmittance will be displayed again on the feedback display screen 5, which means that the upper limit value of transmittance will temporarily occupy an original digital display position used to display the real-time transmittance during the adjustment process. The real time transmittance is the most intuitive data reflecting the current shading effect of the liquid crystal glass 1, which can assist the user in judging the current ambient light and whether the device is currently malfunctioning. After it is temporarily occupied, the occupation permission should be quickly revoked.

S4, feeding back the light intensity signal at preset time intervals, by the photosensitive sensor, and dynamically adjusting the real-time transmittance of the liquid crystal glass 1 based on the light intensity signal; adjusting the lower limit value and upper limit value of transmittance according to a preset mode when a difference between two adjacent light intensity signals exceeds a preset light intensity threshold.

Similarly, there is no necessary sequential relationship between S3 and S4, which depends on the current state of the device.

S4 limits a process of dynamically adjusting the real-time transmittance of the liquid crystal glass 1. Specifically, the lower limit value and upper limit value of transmittance are adjusted according to a preset mode, including: if the intensity signal at a previous moment is less than the light intensity signal at a next moment, and a difference between the two intensity signals exceeds the preset intensity threshold, the real-time transmittance of the liquid crystal glass 1 will raises from the lower limit value of transmittance to the upper limit value of transmittance within a third preset time, or, if the light intensity signal at the previous moment is greater than the light intensity signal at the next moment, and the difference between the two light intensity signals exceeds the preset light intensity threshold, the real-time transmittance of the liquid crystal glass 1 will uniformly decrease from the upper limit value of transmittance to the lower limit value of transmittance within a fourth preset time, the fourth preset time is set to at least four times the third preset time.

Here are two examples to illustrate. Firstly, if the vehicle exits from a relatively dark location such as a tunnel, the light intensity signal will suddenly change from low to high. The system needs to respond immediately to avoid strong light affecting the driver's line of sight. The real-time transmittance of the liquid crystal glass 1 quickly climbs from the lower limit value of transmittance to the upper limit value of transmittance within the third preset time. For example, the real-time transmittance of liquid crystal glass 1 climbs from 0% to 100% within 0.2 seconds. On the contrary, when the vehicle enters the tunnel, the light intensity signal will suddenly change from high to low. At this time, the system should control the real-time transmittance of the liquid crystal glass 1 to slowly decrease to the lower limit value of transmittance within 2 seconds, allowing the user to have sufficient time to adapt to the dark environment.

In this embodiment, the fourth preset time is set to at least 4 times the third preset time, which is suitable for physiological adjustment of human eye pupil. Therefore, the third preset time does not exceed 0.5 seconds, the setting range of the fourth preset time can only be 2-3 seconds.

Furthermore, the liquid crystal glass sunshade further includes an on/off button (not shown), which is configured to directly conduct or disconnect the power module with the liquid crystal glass 1. The user can manually press the on/off key to actively enter the turn-on/turn-off state. In the turn-off state, a duration of the on/off key that is pressed is continuously detected, when the duration exceeds a fifth preset time, a preset mode selection program is entered, the preset mode selection program includes adjusting the third preset time and the fourth preset time.

Due to the fact that the preset mode selection program is a very useful function, in one example, the fifth preset time can be set to 10 seconds to prevent the user from accidentally touching it. After entering the preset mode selection program, the duration of the on/off key that is pressed is continuously detected, when the duration is less than a sixth preset time, the preset mode is switched, preset mode is displayed on the feedback display screen; when the duration is greater than a seventh preset time, a selected preset mode is saved, the preset mode selection program is exited and the turn-on state is immediately entered.

Considering that the device has entered the preset mode selection program, which is a very useful function, it should quickly return to a normal turn-on state after completing this setting. Therefore, the sixth preset time is generally set to 0.2 seconds, which means that the on/off key is detected by a short pressing. The seventh preset time can be set to long pressing for 3 seconds to save the selected preset mode and exit the preset mode selection program, which can avoid the user accidentally touching to exit the preset mode selection program. In addition, if the on/off key that is pressed is not detected to be a long time (assuming 20 seconds), the system will automatically exit the preset mode selection program.

In an example, the preset modes include:
in a first mode, the third preset time is set to 0.2 seconds, the fourth preset time is set to 2 seconds;
in a second mode, the third preset time is set to 0.2 seconds, the fourth preset time is set to 3 seconds;
in a third mode, the third preset time is set to 0.5 seconds, the fourth preset time is set to 2 seconds;
in a fourth mode, the third preset time is set to 0.5 seconds, the fourth preset time is set to 3 seconds.

The preset modes are optional options pre-set by the system, and the user is not allowed to adjust them freely.

Embodiment 3

Figure 5:
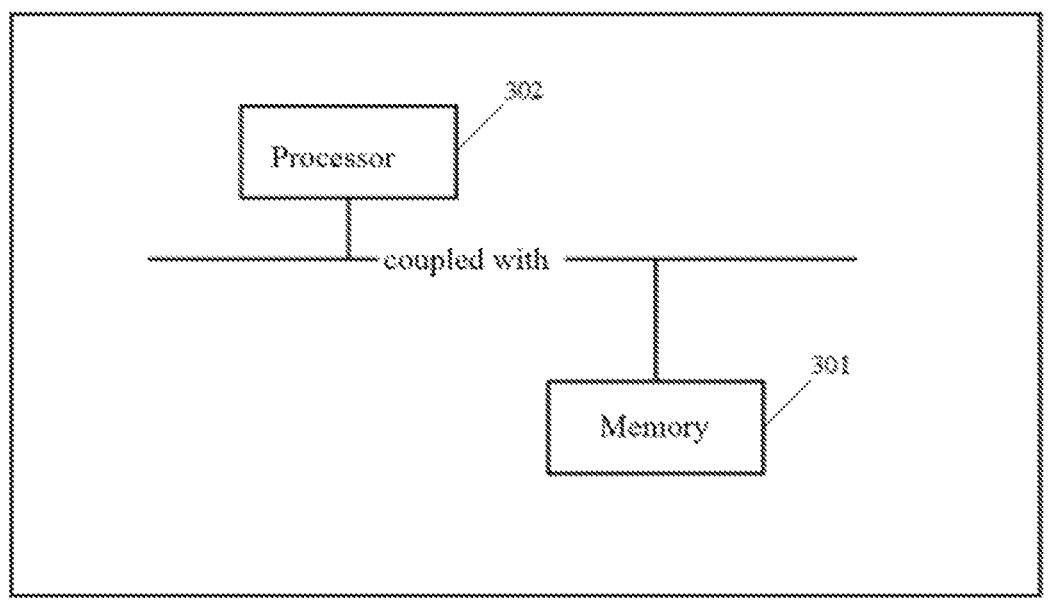
FIG. 5 is a structural schematic diagram of the device for controlling the liquid crystal glass sunshade disclosed in Embodiment 3 of the present disclosure.

Please refer to FIG. 5, which is a structural schematic diagram of a device for controlling the liquid crystal glass sunshade in an embodiment of the present disclosure. As shown in FIG. 5, the device can include:
a memory 301, configured to store an executable program code;
a processor 302 coupled with memory 301;
the processor 302 calls the executable program code stored in the memory 301 to execute the steps of the method for controlling a liquid crystal glass sunshade described in Embodiment 1.

Embodiment 4

This embodiment discloses a computer program product, which includes a non-instantaneous computer-readable storage medium for storing a computer program, and the computer program can be operated to perform the steps of the method for controlling a liquid crystal glass sunshade described in embodiment 1.

The device embodiments described above are only illustrative, where the modules described as a separate component can be or may not be physically separated, and the components displayed as modules can be or may not be a physical module, which can be located in one place or distributed across multiple network module. Some or all modules can be selected according to an actual need to achieve a purpose of this embodiment. Ordinary technical personnel in this field can understand and implement it without creative work.

Through the specific description of the above embodiments, technical personnel in this field can clearly understand that each implementation method can be achieved through software and necessary general hardware platforms, and of course, it can also be achieved through hardware. Based on this understanding, the above-mentioned technical solutions or the parts that contribute to the existing technology can be reflected in the form of software products, which can be stored in computer-readable storage media, including Read Only Memory (ROM), Random Access Memory (RAM), Programmable Read Only Memory (PROM), Erasable Programmable Read Only Memory (EPROM), One time Programmable Read Only Memory (OTPROM), Electrically Erasable Programmable Read Only Memory (EEPROM), Compact Disc Read Only Memory (CD-ROM) or other optical disc storage, disk storage, magnetic tape storage or any other computer-readable medium that can be used to carry or store data.

Finally, it should be noted that the disclosure of a method, device, and medium for controlling a liquid crystal glass sunshade disclosed in the embodiments of the present disclosure is only a preferred embodiment of the present disclosure, and is only used to illustrate the technical solution of the present disclosure, not to limit it. Although the present disclosure has been described in detail with reference to the embodiments, those skilled in the art should understand it can still modify the technical solutions recorded in the embodiments, or equivalently replace some of the technical features; and these modifications or replacements do not separate the essence of the corresponding technical solutions from the spirit and scope of the various embodiments of the technical solutions.

What is claimed is:

1. A method for controlling a liquid crystal glass sunshade, wherein the liquid crystal glass sunshade comprises at least a liquid crystal glass, a vibration sensor, a photosensitive sensor, and a solar panel; the control method comprises the following steps:
in a turn-off state, obtaining vibration signal feedback from the vibration sensor; when the vibration signal exceeds a preset vibration threshold and simultaneously detects a presence of light intensity signal input from the photosensitive sensor and voltage input from the solar panel, the liquid crystal glass conducts with the power module and enters a turn-on state;
in the turn-on state, obtaining the vibration signal feedback from the vibration sensor; when the vibration signal does not exceed the preset vibration threshold within a first preset time, or a battery level of the power module is lower than a preset battery level threshold, the liquid crystal glass is disconnected from the power module and enters the turn-off state.

2. The method for controlling a liquid crystal glass sunshade as claimed in claim 1, wherein the liquid crystal glass sunshade further comprises a sliding touch panel and a feedback display screen, the liquid crystal glass sunshade has a preset lower limit value and upper limit value of transmittance;

in the turn-on state, sliding signal feedback by the sliding touch panel is detected, the upper limit value of transmittance is adjusted based on the sliding signal, and the upper limit value of transmittance is displayed on the feedback display screen within a second preset time range; after the second preset time range, real-time transmittance is displayed on the feedback display screen.

3. The method for controlling a liquid crystal glass sunshade as claimed in claim 1, wherein the photosensitive sensor feed backs the light intensity signal at a preset time interval, dynamically adjusts the real-time transmittance of the liquid crystal glass based on the light intensity signal; when a difference between two adjacent light intensity signals exceeds the preset light intensity threshold, the lower limit value and upper limit value of transmittance are adjusted according to a preset mode.

4. The method for controlling a liquid crystal glass sunshade as claimed in claim 3, wherein the lower limit value and upper limit value of transmittance are adjusted according to the preset mode, comprising:

when the light intensity signal at a previous moment is less than the light intensity signal at a next moment, and the difference between the two light intensity signals exceeds the preset light intensity threshold, the real-time transmittance of the liquid crystal glass raises from the lower limit value of transmittance to the upper limit value of transmittance within a third preset time, or when the light intensity signal at the previous moment is greater than the light intensity signal at the next moment, and the difference between the two light intensity signals exceeds the preset light intensity threshold, the real-time transmittance of the liquid crystal glass uniformly decreases from the upper limit value of transmittance to the lower limit value of transmittance within a fourth preset time; wherein the fourth preset time is set to at least four times the third preset time.

5. The method for controlling a liquid crystal glass sunshade as claimed in claim 4, wherein the third preset time does not exceed 0.5 seconds, the fourth preset time is 2-3 seconds.

6. The method for controlling a liquid crystal glass sunshade as claimed in claim 4, wherein the liquid crystal glass sunshade further comprises an on/off key, which is configured to directly conduct or disconnect the power module with the liquid crystal glass; in the turn-off state, a duration of the on/off key that is pressed is continuously detected, when the duration exceeds a fifth preset time, a preset mode selection program is entered, the preset mode selection program comprises adjusting the third preset time and the fourth preset time.

7. The method for controlling a liquid crystal glass sunshade as claimed in claim 6, wherein after entering the preset mode selection program, the duration of the on/off key that is pressed is continuously detected, when the duration is less than a sixth preset time, the preset mode is switched, preset mode is displayed on the feedback display screen; when the duration is greater than a seventh preset time, a selected preset mode is saved, the preset mode selection program is exited and the turn-on state is immediately entered.

8. The method for controlling a liquid crystal glass sunshade as claimed in claim 7, wherein that the preset mode comprises:

in a first mode, the third preset time is set to 0.2 seconds, the fourth preset time is set to 2 seconds;

in a second mode, the third preset time is set to 0.2 seconds, the fourth preset time is set to 3 seconds;

in a third mode, the third preset time is set to 0.5 seconds, the fourth preset time is set to 2 seconds;

in a fourth mode, the third preset time is set to 0.5 seconds, the fourth preset time is set to 3 seconds.

9. A device for controlling a liquid crystal glass sunshade, wherein the device comprises a memory, a processor, and a communication module, wherein:

the memory is configured to store an executable program code;

the processor is coupled with the memory;

the processor calls the executable program code stored in the memory to execute the method for controlling a liquid crystal glass sunshade as claimed in claim 1.

10. A computer storable medium, wherein the computer storable medium stores a computer instruction, when calls the computer instruction, the method for controlling a liquid crystal glass sunshade as claimed in claim 1 is executed.

\* \* \* \* \*